Feb. 6, 1962  M. M. KEY  3,019,844
VEHICLE MOUNTED EDGERS
Filed Nov. 24, 1958  3 Sheets-Sheet 1

INVENTOR
Milford M. Key

BY *Ehley & Ehley*

ATTORNEYS

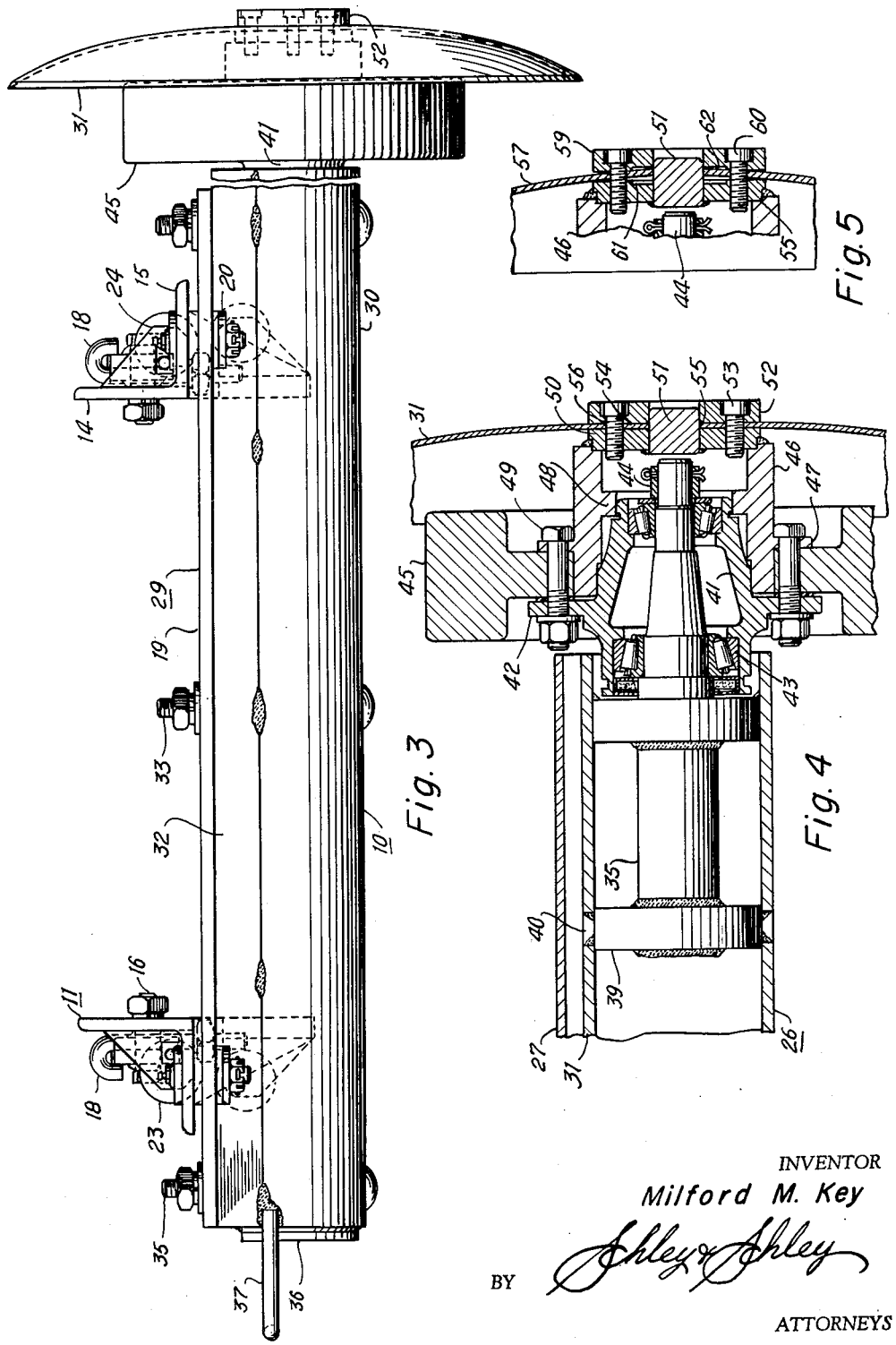

INVENTOR
Milford M. Key

BY *Ashley & Ashley*

ATTORNEYS

United States Patent Office 3,019,844
Patented Feb. 6, 1962

3,019,844
VEHICLE MOUNTED EDGERS
Milford M. Key, P.O. Box 161, Cleburne, Tex.
Filed Nov. 24, 1958, Ser. No. 776,132
2 Claims. (Cl. 172—15)

This invention relates to new and useful improvements in edgers and more particularly to vehicle mounted edgers.

One object of the invention is to provide an improved edger adapted to be mounted on a tractor or other vehicle for trimming grass adjacent curbs, sidewalks and other pavement and which is maintained in engagement with the pavement irrespective of relative lateral movement of the vehicle so as to produce substantially perfect edges.

A particular object of the invention is to provide an improved vehicle mounted edger which is adapted to be pivotally suspended from a vehicle for limited movement about an upright axis whereby the vehicle may wander or travel toward and away from the pavement being edged without moving the edger out of engagement with said pavement whereby no exceptional skill is required to use the edger.

Another object of the invention is to provide an improved vehicle mounted edger which is readily reversible so as to be capable of being mounted on either side of the vehicle whereby said vehicle may ride on the pavement or grass and may travel with or against the movement of traffic.

An important object of the invention is to provide an improved vehicle mounted edger, of the character described, having a rotatable cutting blade of the disk type for engaging the edge of a pavement and adjustably mounted for positioning in parallel or angular relation to the pavement edge whereby the leading and trailing edges of the blade may contact said pavement edge to cut the grass without removing soil, or whereby only the leading edge of said blade may contact said pavement edge to cut the grass and the trailing edge pushes the soil away from said pavement edge to remove soil sliced by said leading edge and form a shallow trench between the grass and pavement.

A further object of the invention is to provide an improved vehicle mounted edger, of the character described, wherein the blade is dished or concavo-convex so as to have a tendency to move in the direction of its concavity and cling to the edge of the pavement when the concavity is adjacent said pavement edge.

A construction designed to carry out the invention will be hereinafter described, together with other features of the invention.

Figure 1:
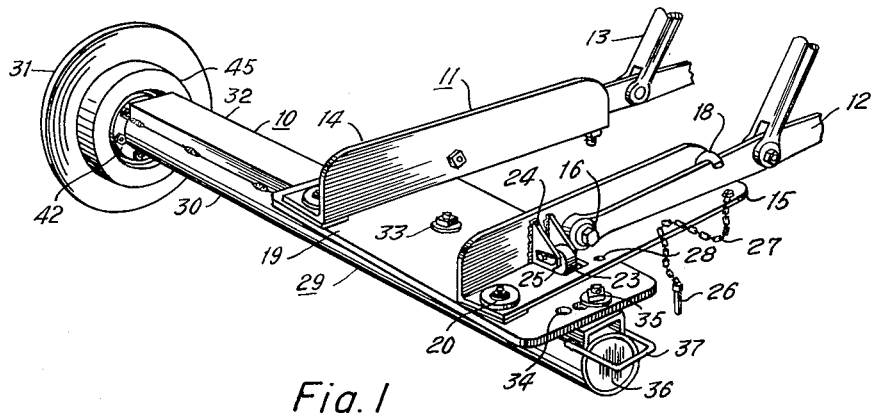
Figure 2:
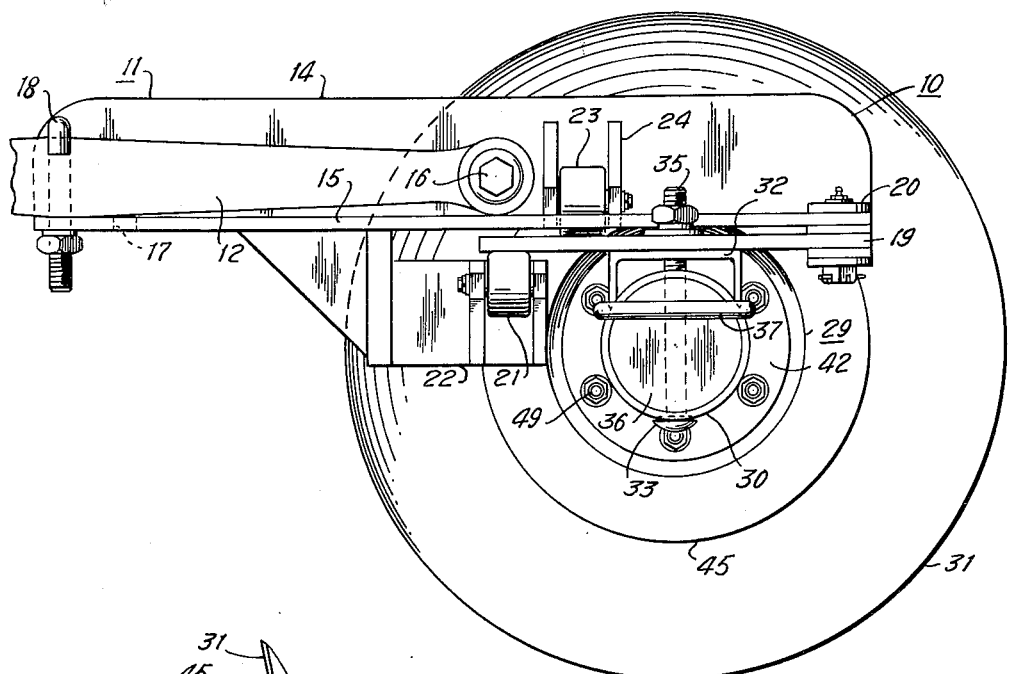
Figure 9:
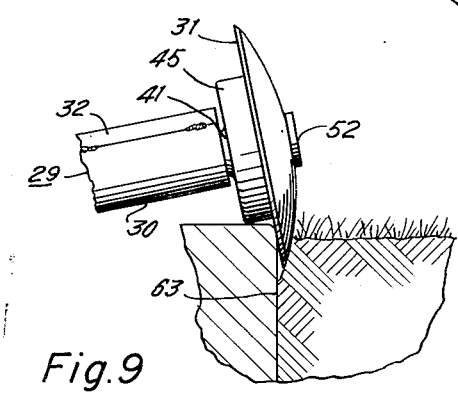
Figure 6:
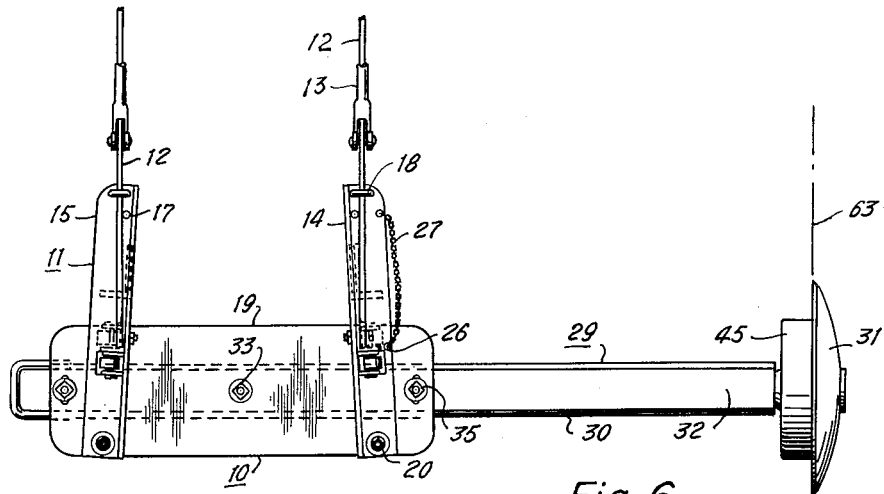
Figure 7:
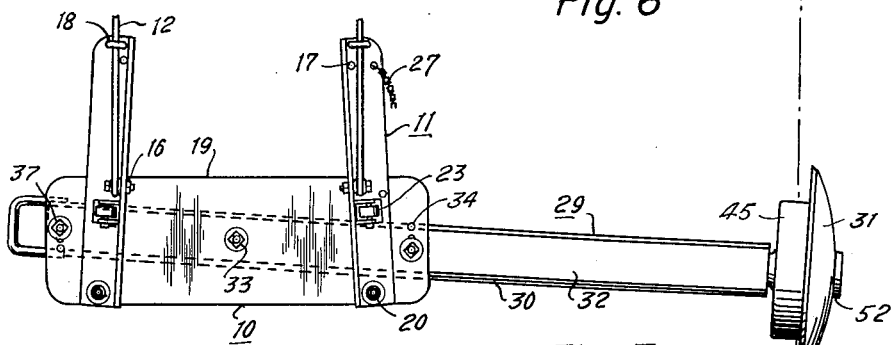
Figure 8:
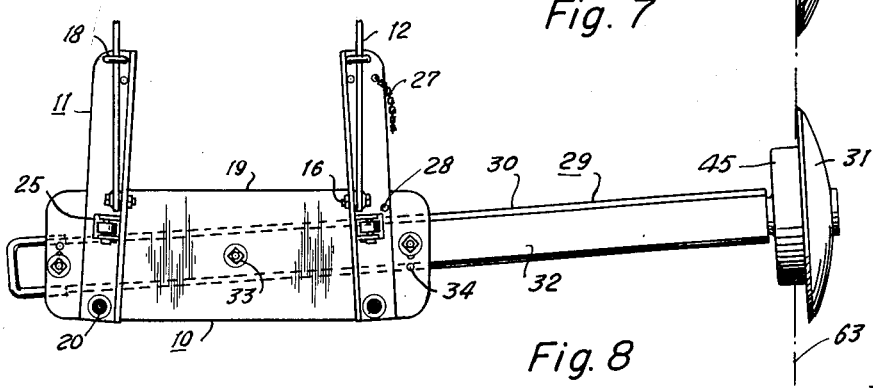

The invention will be more readily understood from a reading of the following specification and by reference to the accompanying drawings, wherein examples of the invention are shown, and wherein:

FIG. 1 is a perspective view of a edger constructed in accordance with the invention and connected to the lift arms of a tractor, FIG. 2 is an enlarged, side elevational view of the edger, FIG. 3 is an enlarged, rear elevational view of the edger, FIG. 4 is an enlarged, longitudinal, sectional view showing the rotatable mounting of the cutting blade, FIG. 5 is a fragmentary, sectional view showing a modified blade and its mounting, FIG. 6 is a plan view of the edger with its blade in parallel relation to the edge of a pavement, FIG. 7 is a view, similar to FIG. 6, with only the trailing edge of the blade in contact with the pavement edge, FIG. 8 is a view, similar to FIG. 6, with only the leading edge of the blade in contact with the pavement edge, and FIG. 9 is a fragmentary, elevational view showing the inclination of the blade relative to the pavement edge.

In the drawings, the numeral 10 designates an edger adapted to be mounted on a tractor or other vehicle and having a pair of spaced, horizontal frame members or bars 11 for connection with supporting arms 12 extending rearwardly from the tractor or other vehicle and longitudinally of its direction of travel. The links 13 of a lift mechanism (not shown) are pivotally attached to the intermediate portions of the arms 12 which are pivotally mounted for limited lateral movement independently of each other as well as vertical movement in the usual manner. Each frame member 11 is right angular in cross-section and has an upright flange 14 disposed inwardly of one of the arms and a lower flange 15 directed outwardly and underlying said arm. A conventional swivel fastener 16 connects the intermediate portion of the flange 14 to the rear end of the arm 12, and openings 17 (FIGS. 6-8) are formed in the front end portion of the flange 15 adjacent said flange 14 for receiving an upstanding J-bolt 18 having the usual nut and hooked over said arm. It is noted that a pair of openings is provided in each lower flange to permit adjustment of the J-bolt 18 in accordance with the length of the supporting arm. Since the J-bolts are disposed between the upright flanges and arms, the frame members diverge rearwardly in non-parallel relation to the arms; however, said frame members are movable laterally and vertically with said arms.

A flat, rectangular base member or plate 19, of greater length than width, underlies and has its rear longitudinal portion pivotally attached in spaced relation to the rear portions of the lower flanges 15 by upright bearings 20 so as to extend transversely of the frame members 11 and be capable of limited movement relative thereto. As shown in FIG. 2, the front longitudinal margin of the plates rests on underlying rollers 21 carried by brackets 22 which depend from the lower flanges. Overlying rollers 23, supported by lateral brackets 24 on the upright flanges 14 and projecting through slots 25 in the lower flanges, engage the front portion of the plate 19 adjacent the rollers 21 whereby said front portion is confined between the upper and lower rollers and said plate is maintained in substantially parallel relation to said lower flanges. Manifestly, the bearings and rollers facilitate relative pivotal movement between the frame members and plate. For fastening the plate and frame members against relative movement, a latch pin 26 is attached to one of the lower flanges by a chain 27 and is adapted to be engaged in registerable openings 28 in said flange and plate.

A cutting arm assembly 29 is pivotally supported by the plate 19 and includes an elongated cylindrical sleeve or barrel 30 having a rotatable edging blade 31 on its outer end and a coextensive, inverted channel or U-shaped member 32 overlying and welded or otherwise secured thereto (FIGS. 1–3). The arm assembly 29 extends longitudinally of the plate and transversely of the frame members 11 with its channel 32 in underlying engagement with said plate. An upright pin or bolt 33, having the usual nut, extends transversely through the inner end portions of the sleeve 30 and its channel and the medial portion of the plate for pivotally connecting the assembly to said plate with the inner ends of said sleeve and channel substantially flush with one end of said plate. Due to its extended length, the outer end portion of the assembly projects laterally beyond the opposite end of the plate to position the blade 31 an appreciable distance therefrom. For securing the arm assembly in adjusted positions, each end portion of the plate has a trio of openings 34 arranged in an arc about the axis of the pivot bolt 33 and transversely of said plate for engagement by coacting nuts and bolts or fasteners 35 carried by the channel. As shown in FIGS. 6–8, each bolt 35 is movable from one opening 34 to another of each trio to permit positioning of the arm assembly in any one of three angular relationships. The blade 31 may be secured in substantially parallel relation to the transverse ends of the plate (FIG. 6), at a rearward angle (FIG. 7) or a forward angle (FIG. 8). Also, the arm assembly may be rotated about the axis of the bolt 33 to dispose the blade on either side of the plate (FIG. 1). Preferably, a circular plate 36 closes the inner end of the sleeve and a U-shaped handle 37 may be secured and project from said inner end for manipulating the edger and swinging the arm assembly from position to position.

For rotatably supporting the blade 31, a spindle 38 extends axially into the outer end of the sleeve 30 and has a pair of spaced collars or rings 39 welded or otherwise secured to its inner end portion. As shown by the numeral 40 in FIG. 4, the inner collar 39 is spot welded to the sleeve through suitable openings. A hub 41, having an external, radial flange 42, is journaled on the outer end of the spindle 38 by a pair of spaced bearings 43 and is confined thereon by a conventional retainer or nut 44 overlying the outer bearing. The hub 41 supports an annular gauge element or wheel 45, which is T-shaped in cross-section, and a cylindrical housing or collar 46 having an external diameter substantially equal to the internal diameter of the wheel. External and internal, radial flanges 47 and 48 are formed on the housing 46 intermediate its ends for respective engagement with the wheel and the outer end portion of the hub. For mounting the wheel 45 on the inner end of the housing, the inner peripheral portion of said wheel is confined between and secured to the flanges 42 and 47 by nuts and bolts or fasteners 49 extending therethrough. An annular, relatively thick plate or ring 50, overlies and is welded or otherwise secured to the outer end of the housing 46, which extends beyond the spindle 38 and retainer 44, and has an external, axial projection or shear pin 51. Preferably, the pin is in the form of a short, cylindrical bar extending through and welded to the ring 50. A similar ring 52 engages over the outer end of the pin 51 and is fastened to the ring 50 by a plurality of screws 53 for confining the central portion of the blade between the rings.

The blade 31 is circular, being of the disk type, and is dished or concavo-convex. As shown by the numeral 54, the axial portion of the blade is flat for clamping engagement by the contiguous surfaces of the rings 50 and 52. An axial opening 55 is formed in the blade for receiving the pin 51 and is surrounded by a ring of openings 56 through which the screws 53 extend. It is noted that the blade is reversible and that its concavity may be directed inwardly, as shown, or outwardly. Although it is preferable that the blade have its axial portion flattened, an unflattened blade 57 may be employed. As shown in FIG. 5, the blade 57 is concavo-convex or dished throughout its area and is confined between annular plates or rings 58 and 59, similar to the rings 50 and 52, by screws 60. Annular recesses 61 and 62 are formed in the contiguous surfaces of the rings 58 and 59 at their inner peripheral portions for accommodating the curvature of the axial portion of the blade. By providing a recess in each ring, the blade is reversible and may be mounted with its concavity directed inwardly or outwardly. With the exception of its axial portion, the blade 57 is identical to the blade 31.

As has been explained, the edging blade may be mounted on either side of the tractor or vehicle due to the pivotal mounting of the cutting arm assembly 29. Since the blade as well as the arm assembly is reversible, the tractor or vehicle may ride on the grass or pavement and may travel with or against the movement of traffic. In use, the concave side of the blade is positioned adjacent the edge of the curb, sidewalk or other pavement, shown by broken line 63 in FIGS. 6–8, whereby said blade clings to the pavement edge because of its tendency to move in the direction of its concavity. The blade is rotated by its engagement with the soil which resists its movement with the tractor or vehicle, and the wheel 45 limits the depth of penetration of said blade as well as provide weight for causing penetration thereof. Due to the pivotal connection of the plate 19 to the frame members 11, limited lateral movement of the arm assembly is permitted without moving the blade out of contact with the pavement edge 63. This permits the tractor or vehicle to wander slightly and makes it unnecessary for it to travel in absolute parallel relation to the pavement edge. It is noted that the mounting of the edger permits its use when the pavement edge is above or below the surface upon which the tractor rides. Although not shown, it is contemplated that a suitable weight may be placed on the outer projecting end of the arm assembly and the channel 32 provides a flat surface for supporting the weight. It is desirable to use a weight when the soil has built up adjacent the pavement edge, such as due to infrequent edging. For increasing the tendency of the blade to move in the direction of its concavity and to insure its clinging to the pavement edge, said blade is inclined downwardly from the vertical toward its convex side whereby the lower portion of said blade is spaced from said pavement edge (FIG. 9). This is accomplished by lowering or raising one of the frame members relative to the other member so that the plate 19 and arm assembly are inclined and not horizontal in operation.

When the bolts 35 are connected to the center openings 34 of the plate 19, the cutting arm assembly 29 extends at a right angle to the direction of travel to support the blade in parallel relation to the pavement edge 63. As shown in FIG. 6, both the leading and trailing edges of the blade contact the pavement edge so as to cut the grass without removing any soil. In this position, the blade has minimum depth or penetration and is ideal in frequently edged areas where soil removal is not a problem. For slicing the soil as well as cutting the grass adjacent the pavement edge, the arm assembly is swung rearwardly to dispose the blade at a rearward angle to the pavement edge. As shown in FIG. 7, the arm assembly is secured in this position by engaging the left-hand bolt 35 in the front opening 34 and the right-hand bolt in the rear opening. Only the trailing edge of the blade contacts the pavement edge and it functions to lift and remove the turf or soil and grass cut by the leading edge. Since the leading edge of the blade is spaced from the pavement edge, a shallow trench is formed by said leading edge and is cleaned out by the trailing edge. In addition to removing built-up soil, this position of the blade is advantageous when the pavement edge is irregular or uneven and when the turf is packed or tough and hard to cut. By engaging the left-hand bolt in the rear opening and the right-hand bolt in the front opening, as shown in FIG. 8, the arm assembly is swung forwardly and the blade is at a forward angle to the pavement edge. While the leading edge cuts the grass, the trailing edge pushes the soil away from the pavement edge due to the spaced relationship of the latter edge. As a result, a sharp, concise edge is formed without removing soil. Again, it is pointed out that it is preferable to support the blade at an angle to the vertical so that its lower portion is spaced from the pavement edge as shown in FIG. 9.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:
1. Means for mounting an edger on a vehicle including a pair of substantially horizontal frame members ex- tending longitudinally of the vehicle and mounted thereon for limited lateral movement relative to each other, a plate extending transversely between the frame members, a pair of upright fasteners pivotally connecting the plate to said frame members for limited relative movement about upright axes, an arm extending transversely between said frame members in superimposed relation to said plate and having an outer end portion projecting laterally of said members for supporting the edger, an upright fastener pivotally connecting the inner end portion of the arm to said plate for movement about an upright axis to vary the angular relationship of said arm to said plate, the limited movement of said frame members and plate permitting limited longitudinal movement of said arm laterally of the vehicle, and means attaching said arm to said plate in adjusted angular positions.

2. Edger mounting means as set forth in claim 1 wherein the plate underlies the frame members and overlies the arm.

References Cited in the file of this patent

UNITED STATES PATENTS

| | | |
|---|---|---|
| 1,181,281 | Albert | May 2, 1916 |
| 2,136,834 | Baird | Nov. 15, 1938 |
| 2,139,212 | Tonjes | Dec. 6, 1938 |
| 2,364,887 | Wray | Dec. 12, 1944 |
| 2,512,114 | Robinson et al. | June 20, 1950 |
| 2,564,355 | Danuser | Aug. 14, 1951 |
| 2,630,052 | Jory | Mar. 3, 1953 |
| 2,746,770 | Sorensen et al. | May 22, 1956 |
| 2,775,179 | Chambers et al. | Dec. 25, 1956 |
| 2,831,705 | Ellis | Apr. 22, 1958 |
| 2,906,080 | Light | Sept. 29, 1959 |
| 2,913,058 | Smith et al. | Nov. 17, 1959 |